US011909932B2

(12) United States Patent
Tsujimoto et al.

(10) Patent No.: US 11,909,932 B2
(45) Date of Patent: Feb. 20, 2024

(54) IMAGE FORMING APPARATUS, INFORMATION PROCESSING APPARATUS, INFORMATION COLLECTING METHOD, AND RECORDING MEDIUM

(71) Applicant: Konica Minolta, Inc., Tokyo (JP)

(72) Inventors: Takahiro Tsujimoto, Toyokawa (JP); Akinori Kimata, Toyokawa (JP); Kenichi Hayashi, Anjyo (JP); Noriyuki Jinbo, Hamamatsu (JP); Shiro Umeda, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/064,342

(22) Filed: Dec. 12, 2022

(65) Prior Publication Data

US 2023/0188658 A1 Jun. 15, 2023

(30) Foreign Application Priority Data

Dec. 13, 2021 (JP) ................. 2021-201882

(51) Int. Cl.
*G06K 15/00* (2006.01)
*G06K 15/02* (2006.01)
*H04N 1/00* (2006.01)
*G06F 8/65* (2018.01)

(52) U.S. Cl.
CPC ........... *H04N 1/00724* (2013.01); *G06F 8/65* (2013.01); *H04N 1/00726* (2013.01); *H04N 1/00729* (2013.01)

(58) Field of Classification Search
CPC ........... H04N 1/00724; H04N 1/00726; H04N 1/00729; G06F 8/65
See application file for complete search history.

(56) References Cited

U.S. PATENT DOCUMENTS

| 2003/0072028 | A1* | 4/2003 | Haines | ................. | G06K 15/12 |
| | | | | | 358/1.15 |
| 2008/0056738 | A1* | 3/2008 | Horn | ................. | G03G 15/6508 |
| | | | | | 399/16 |
| 2012/0147389 | A1* | 6/2012 | Ishihara | ............. | H04N 1/00087 |
| | | | | | 358/1.2 |
| 2014/0241742 | A1* | 8/2014 | Hoshi | ................... | G01N 21/55 |
| | | | | | 399/45 |
| 2020/0192261 | A1* | 6/2020 | Ogata | ................. | G03G 15/5025 |
| 2022/0210284 | A1* | 6/2022 | Tanaka | ............... | H04N 1/00732 |
| 2022/0234850 | A1* | 7/2022 | Tokuma | ............. | H04N 1/00798 |

FOREIGN PATENT DOCUMENTS

JP 2009-271139 11/2009

* cited by examiner

*Primary Examiner* — Moustapha Diaby

(74) *Attorney, Agent, or Firm* — BakerHostetler

(57) ABSTRACT

An image forming apparatus includes: a sensor configured to detect first information related to a physical property value of a sheet, the sheet to have an image formed thereon; and a processor configured to: obtain second information related to a brand of the sheet; and store the first information and the second information in a memory, the first information being detected by the sensor, the second information being obtained by the processor.

21 Claims, 14 Drawing Sheets

| Allowable Threshold Range | | Sheet Type | Detected Grammage Threshold | | | | | |
|---|---|---|---|---|---|---|---|---|
| | | | Japan | | USA | | EU | |
| | | | Threshold Range (for Japan) | | Threshold Range (for Inch) | | Threshold Range (for EU) | |
| Minimum | Maximum | | Minimum | Maximum | Minimum | Maximum | Minimum | Maximum |
| 52 | 59 | Thin Paper | – | 58.7 | – | 58.7 | – | 58.7 |
| 60 | 70 | ECO | – | – | – | – | – | – |
| 71 | 90 | Plain Paper | 58.8 | 96.2 | 58.8 | 98.3 | 58.8 | 96.2 |
| 91 | 105 | Plain Paper + | 96.3 | 109.9 | 98.4 | 110.6 | 96.3 | 109.9 |
| 106 | 120 | Thick Paper 1 | 110 | 123.9 | 110.7 | 139.9 | 110 | 123.9 |
| 121 | 157 | Thick Paper 1+ | 124 | 146.9 | 140 | 146.9 | 124 | 146.9 |
| 158 | 209 | Thick Paper 2 | 147 | 209.9 | 147 | 200.9 | 147 | 209.9 |
| 210 | 256 | Thick Paper 3 | 210 | 259.9 | 201 | 240.9 | 210 | 259.9 |
| 257 | 300 | Thick Paper 4 | 260 | – | 241 | – | 260 | – |

FIG. 5

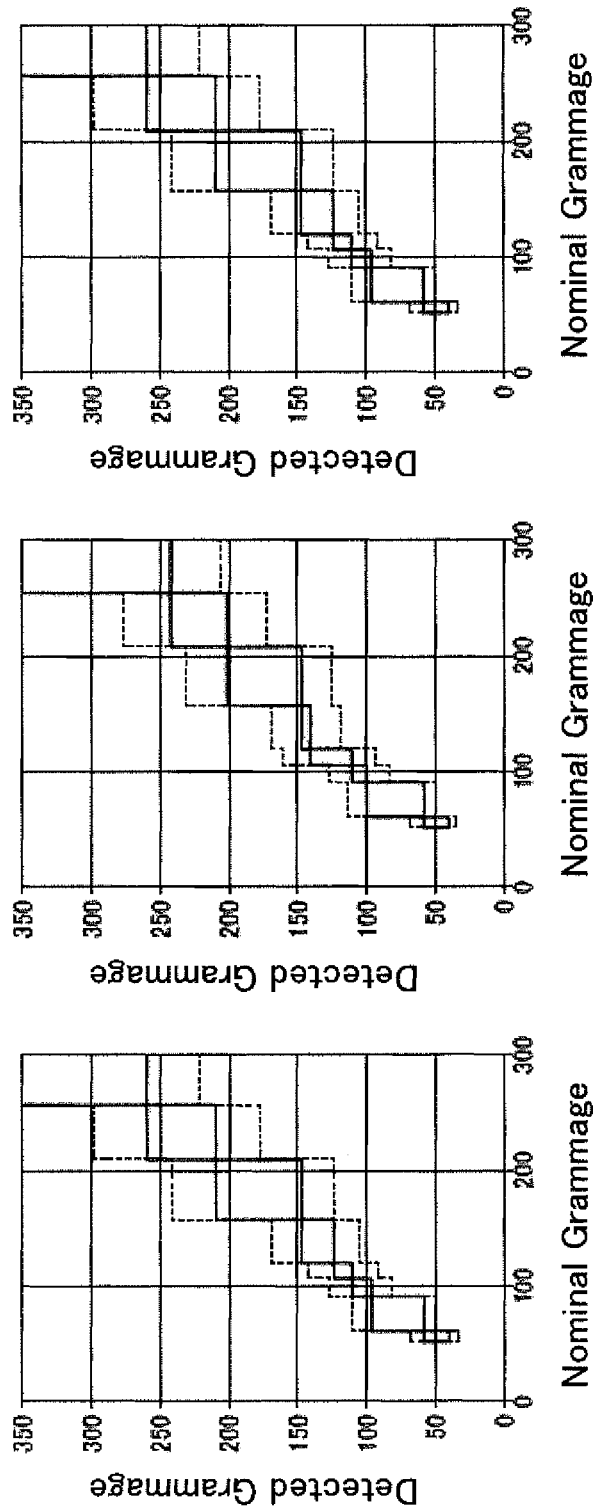

IMAGE FORMING APPARATUS, INFORMATION PROCESSING APPARATUS, INFORMATION COLLECTING METHOD, AND RECORDING MEDIUM

This application claims priority to Japanese Patent Application No. 2021-201882 filed on Dec. 13, 2021, the entire disclosure of which is incorporated herein by reference in its entirety.

BACKGROUND

Technological Field

The present invention relates to: an image forming apparatus such as a copier, a printer, or a digital multifunctional machine which is referred to as MFP; an information processing apparatus that collects information on the type of a sheet to have an image formed thereon; an information collecting method; and a recording medium.

Description of the Related Art

There have been provided an image forming apparatus that automatically recognizes, with an optical sensor or the like, the type of a sheet (sheet type or paper type) (including a sheet of paper) that is a recording medium to have an image formed thereon.

In general, such a sheet type recognizable image forming apparatus recognizes the type of a sheet with reference to its manufacturer's predetermined condition such as a threshold by which the sheet type is recognized. The predetermined conditions are often based on sheet type information having been obtained by the manufacturer. So, when a user uses a sheet type unknown to the manufacturer, none of the predetermined conditions would be applicable, causing a failure in sheet type recognition. To improve accuracy in recognition, it is essential to collect information of unknown sheet types.

Japanese Unexamined Patent Application Publication No. 2009-271139 discloses an image forming apparatus that retrieves a process condition from a remote management system with reference to the trade name of transfer paper and executes printing. Specifically, the image forming apparatus is provided with: a set value memory that stores data of a set value for image forming on a paper type by its trade name; and a trade name obtaining portion that obtains the trade name of transfer paper, so that an operation control value setting portion can set values for operation control, which determine the conditions for image forming. The image forming apparatus has a function of: retrieving, through a communication channel, set value data for the transfer paper by its trade name from a remote management system that is capable of remotely managing a plurality of image forming apparatuses; and storing the data in the set value memory.

The image forming apparatus described in Japanese Unexamined Patent Application Publication No. 2009-271139 does not serve when it comes to data of a sheet type unknown to the manufacturer. To improve accuracy in recognition, there is a need for an image forming apparatus to collect information of sheet types unknown to its manufacturer

SUMMARY

It is an object of the present invention to provide an image forming apparatus, an information processing apparatus, an information collecting method, and a recording medium that are capable of improving accuracy in sheet type recognition by collecting information of sheet types unknown to the manufacturer.

A first aspect of the present invention relates to an image forming apparatus including:
- a sensor configured to detect first information related to a physical property value of a sheet, the sheet to have an image formed thereon; and
- a processor configured to:
  - obtain second information related to a brand of the sheet; and
  - store the first information and the second information in a memory, the first information being detected by the sensor, the second information being obtained by the processor.

A second aspect of the present invention relates to an information processing apparatus including:
- a processor configured to:
  - obtain first information related to a physical property value of a sheet, the sheet to have images formed thereon; and
  - obtain second information related to a brand of the sheet; and
- a memory configured to store the first information and the second information, the first and second information being obtained by the processor.

A third aspect of the present invention relates to an information collecting method including:
- allowing a sensor to detect first information related to a physical property value of a sheet, the sheet to have an image formed thereon;
- allowing a processor to obtain second information related to a brand of the sheet; and
- allowing the processor to store the first information and the second information in a memory, the first information being detected by the sensor, the second information being obtained by the processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is an example of settings in the threshold table.

FIG. 6A is an example graph that reflect thresholds determined in the threshold table shown in FIG. 5.

FIG. 6B is an example graph that reflect thresholds determined in the threshold table shown in FIG. 5.

FIG. 6C is an example graph that reflect thresholds determined in the threshold table shown in FIG. 5.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
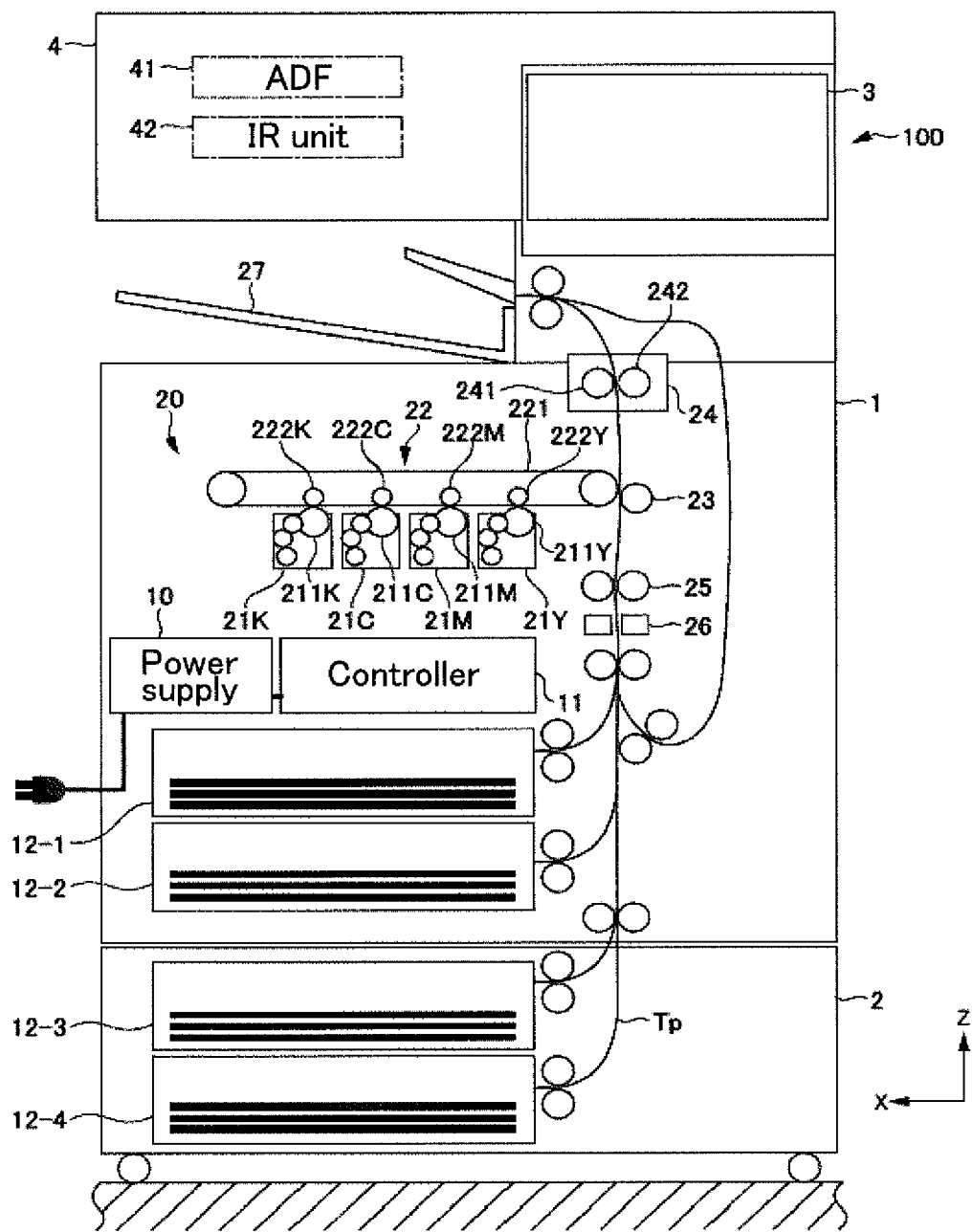
FIG. 1 is a schematic diagram illustrating a configuration of an image forming apparatus according to one embodiment of the present invention.

With reference to FIG. 1, a configuration of an image forming apparatus 100 according to the present embodiment will be described. FIG. 1 is a schematic diagram illustrating an example of a configuration of the image forming apparatus 100 according to the present invention.

The image forming apparatus 100 is a multifunction peripheral (MFP) that performs electrophotographic image forming. The image forming method of the image forming apparatus 100 should not be limited to an electrophotographic method, and it alternatively may be another method such as an inkjet printing method. The image forming apparatus 100 may be, instead of a multifunction machine, a single-function apparatus that performs image forming.

As referred to FIG. 1, the image forming apparatus 100 is provided with: an image forming apparatus main body 1; a paper cabinet 2; a console 3; and a cover 4.

The image forming apparatus main body 1 is provided with: a power supply 10; a controller 11; paper trays 12-1 and 12-2; an image forming section 20; paper stop rollers 25; a basis weight sensor 26; and a paper output tray 27.

The power supply 10 supplies power to every component of the image forming apparatus 100. The controller 11 controls every component of the image forming apparatus 100. The paper trays 12-1 and 12-2 are trays to house sheets (paper). In the present embodiment, the image forming apparatus main body 1 is further provided with a paper cabinet 2 having paper trays 12-3 and 12-4, which is installed in a lower part of the image forming apparatus main body 1. The paper trays 12-1 to 12-4 house sheets different in paper type, size, and the like. Hereinafter, the paper trays 12-1 to 12-4 will be referred to as paper trays 12 as long as there is no need to tell one from another.

The image forming section 20 is provided with: imaging units 21C, 21M, 21Y, and 12K that form toner images in cyan (C), magenta (M), yellow (Y), and black (K); an intermediate transfer unit 22; a second transfer roller 23; and a fuser 24.

The imaging unit 21Y is provided with: a photosensitive drum 211Y; and an electrostatic charger and a development device disposed in the vicinity of the photosensitive drum 211Y (these are indicated by circles in the figure). The imaging unit 21Y draws a latent image on the photosensitive drum 211Y with light emitted from a laser scanning optical unit (not shown) and forms a yellow toner image by transferring negatively-charged toner to the photosensitive drum 211Y.

Descriptions of configurations of the imaging units 21C, 21M, and 21K are omitted herein because their configurations are identical to that of the imaging unit 21Y. Hereinafter, the photosensitive drums 211C, 211M, 211Y, and 211K will be referred to as photosensitive drums 211 as long as there is no need to tell one from another.

The intermediate transfer unit 22 is provided with: an intermediate transfer belt 221 to be driven and rotated; and first transfer rollers 222C, 222M, 222Y, and 222K. Hereinafter, the first transfer rollers 222C, 222M, 222Y, and 222K will be referred to as first transfer rollers 222 as long as there is no need to tell one from another.

The first transfer rollers 222, which are disposed such that they face the photosensitive drums 211 of the imaging units 21, apply an electric field to the intermediate transfer units 22. With the electric field, the intermediate transfer units 22 transfer the toner images formed on the photosensitive drums 211 onto the intermediate transfer belt 221 to combine them. Then, the second transfer roller 23 transfers the combined toner images onto a sheet (one example of a recording material).

The fuser 24 is provided with a heat roller 241 and a pressure roller 242. The heat roller 241 and the pressure roller 242 form a nip by contact with each other. The heat roller 241 is heated by an induction heater (IH) (not shown), a halogen heater (not shown), or the like. The heat roller 241 rotates as driven by the rotation of the pressure roller 242. Upon being delivered to the nip, a sheet is heated by the heat roller 241 to have the toner images fixed thereon. The fuser 24 includes a temperature sensor (not shown) that is a thermistor, for example. The sheet with the fixed toner is discharged onto the paper output tray 27.

The paper stop rollers 25 are rollers which are disposed to be on a front and back side of a sheet being conveyed along a sheet conveyance path Tp. The paper stop rollers 25, which are disposed to be on a front and back side of a sheet being conveyed along the conveyance path Tp, correct rotation and inclination of the sheet by bringing an end of the paper into contact with a nip between the rollers themselves. The basis weight sensor 26 is disposed in the upstream of the paper stop rollers 25 in a sheet conveyance direction of the conveyance path Tp. The basis weight sensor 26 (one example of a physical property value sensor) detects the grammage of the sheet being conveyed along the conveyance path Tp. The basis weight sensor 26 will be later described in detail with reference to FIG. 3.

The console 3 is composed of, for example: a touch sensor as a manual input portion (one example of an input portion); and a touch-screen panel having a display panel as a display in an integrated manner. The manual input portion and the display may be segmented in a mouse, a keyboard, a display panel, and more, for example. The console 3 displays a sheet type setting screen Sc1 (see FIG. 7) in accordance with control of a display controller 16 to be described later.

The sheet type setting screen Sc1 is a screen that shows a sheet type recognized by a sheet type recognition portion 17 and potential sheet types based on the grammage detected by the basis weight sensor 26, in a form of selectable buttons. When a user of the image forming apparatus 100, such as a service person (maintenance technician) or an administrative user, enables a learning mode of learning sheet types, the sheet type setting screen Sc1 is displayed on the display of the console 3 (see FIG. 1), a display of a terminal apparatus (not shown), or the like.

When a user sets sheets of a new type in the paper tray 12 and presses a learning mode start button (not shown) or the like on the display, the new sheet type is learned in the learning mode. The sheet type setting screen Sc1 will be later described in detail with reference to FIG. 7.

The cover 4 is provided with an automatic document feeder (ADF) 41 and an image reading (IR) unit 42. The ADF 41 feeds a document, which is set on a paper feeder (not shown), to a platen (not shown). The IR unit 42 optically scans an image from the document on the platen and generates image data (scan data) by converting the scanned image from analog to digital.

<Control System Configuration of Image Forming Apparatus Main Body>

Figure 2:
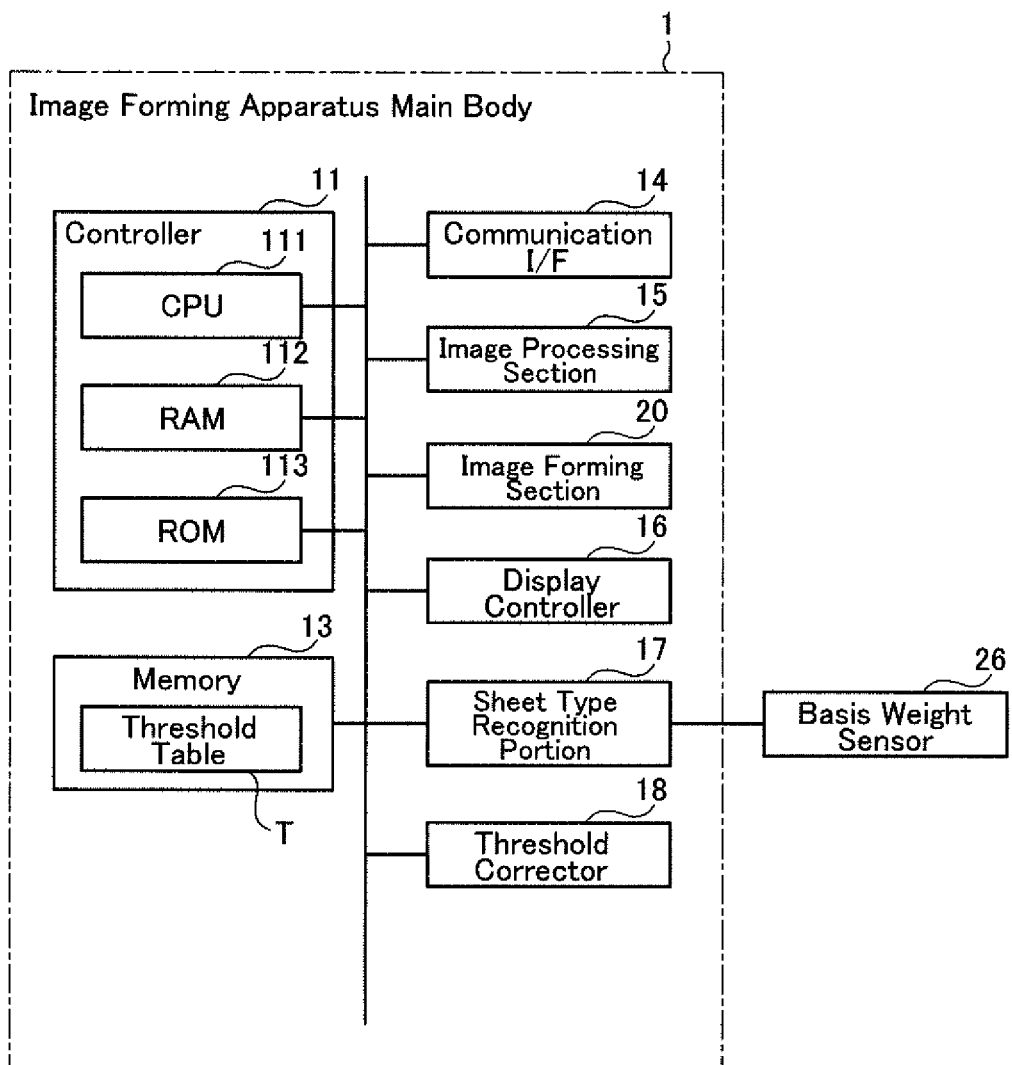
FIG. 2 illustrates a control system configuration of an image forming apparatus main body.

Hereinafter, a control system configuration of the image forming apparatus main body 1 will be described with reference to FIG. 2. FIG. 2 is a block diagram illustrating an example of the control system configuration of the image forming apparatus main body 1.

As referred to FIG. 2, the image forming apparatus main body 1 is provided with: a controller 11; a memory 13; a communication interface (IF) 14; an image processing section 15; the image forming section 20; a display controller 16; a sheet type recognition portion 17; and a threshold corrector 18.

The controller 11 includes: a central processing unit (CPU) 111; a random-access memory (RAM) 112; and a read-only memory (ROM) 113. The CPU 111 retrieves various programs such as system programs, image forming programs, and sheet type recognition programs from the ROM 113, loads them into the RAM 112, and controls every part of the image forming apparatus 100 in accordance with the programs loaded thereon.

The RAM 112 provides a work area to store the various programs executed by the CPU 111 and data related to these programs on a short-term basis.

For example, the ROM 113 is constituted by a non-volatile memory such as a semiconductor memory. The ROM 113 stores system programs and other programs executable on the system programs, such as image forming programs, and sheet type recognition programs. These programs are stored in a form of computer-readable program codes, and the CPU 111 performs operations in order, following the program codes. That is to say, the ROM 113 is used as an example of a non-transitory computer-readable recording medium that stores programs to be executed by a computer.

For example, the memory 13 is constituted by a hard disk drive (HDD), a solid-state drive (SSD), or the like. The memory 13 stores document image data that is included in a print job, a threshold table T, and the like. The threshold table T is a table in which each sheet type is associated with a maximum and minimum grammage of the sheet type. The threshold table T will be later described in detail with reference to FIGS. 4 to 6. The various programs stored in the ROM 113 may be stored in the memory 13, instead. That is to say, the memory 13 is also used as an example of a non-transitory computer-readable recording medium that stores programs to be executed by a computer.

The communication I/F 14 controls communication of various types of data such as print jobs, with a terminal apparatus (not shown) that is connected to the communication I/F 14 through a network (not shown).

The image processing section 15 converts the document image data, which is included in a print job received from the terminal apparatus (not shown), to image data for printing by raster image processing (RIP). The image processing section 15 then performs various image processings on the image data for printing in accordance with print settings that are included in the print job. The image forming section 20 has been described above with reference to FIG. 1 and therefore will not be further described.

Figure 7A:
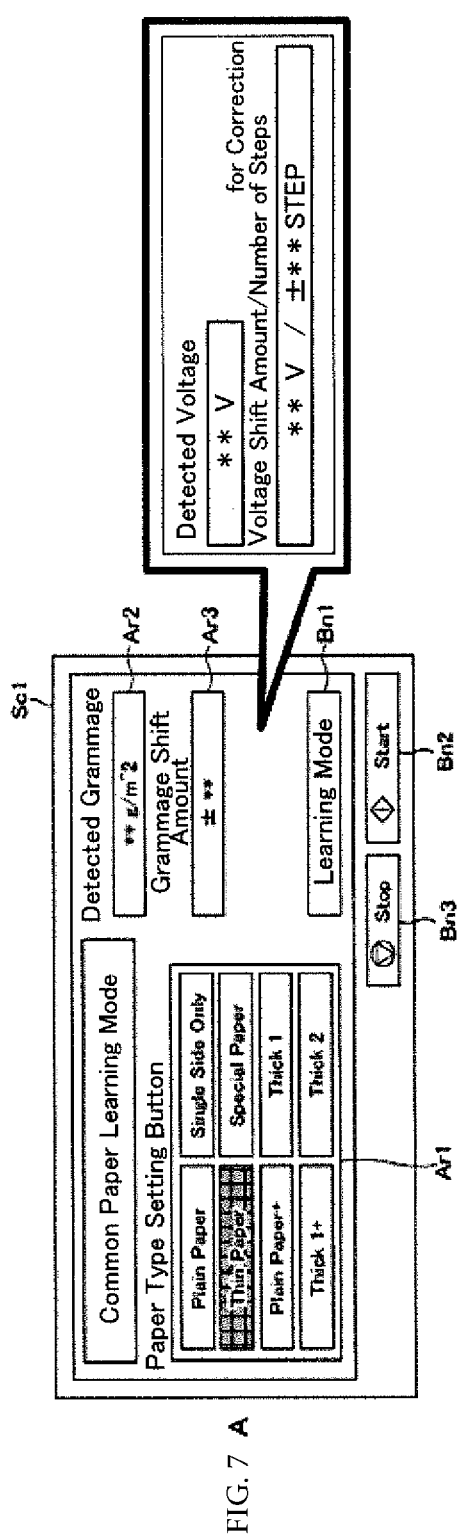
FIG. 7A illustrates sheet type setting screens Sc1.
Figure 7B:
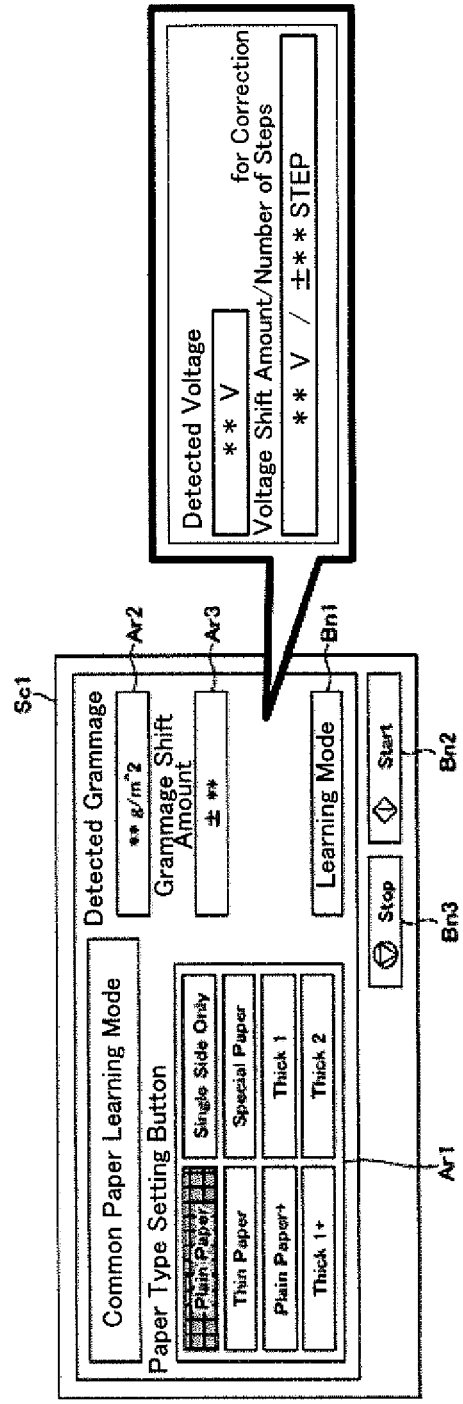
FIG. 7B illustrates sheet type setting screens Sc1.
Figure 8:
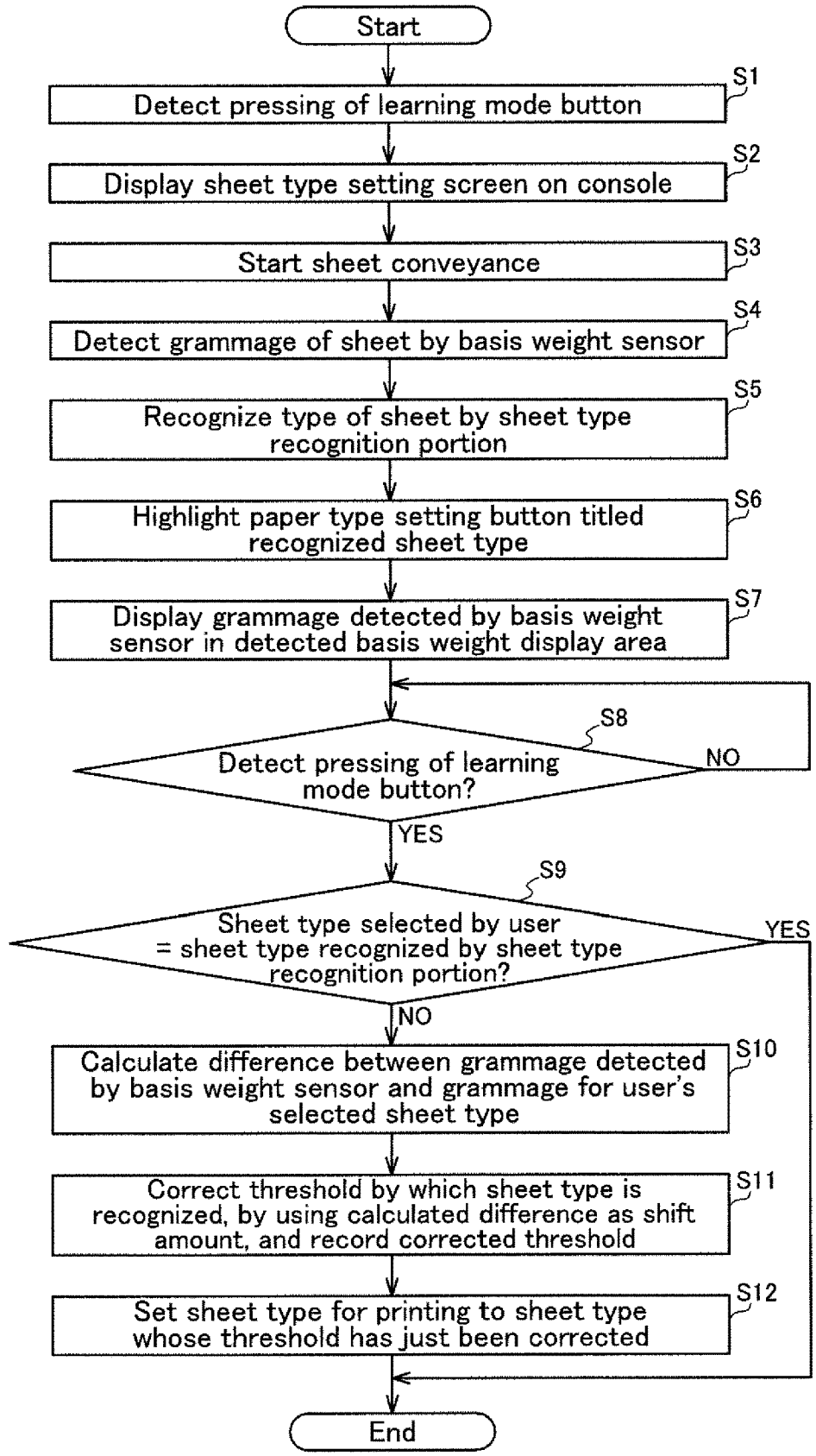
FIG. 8 is a flowchart representing an example of a sheet type recognition process, which is to be followed by the image forming apparatus.

The display controller 16 controls the display of the console 3 (see FIG. 1) so that it can display various screens such as the sheet type setting screen Sc1 (see FIGS. 7 and 8).

The sheet type recognition portion 17 is connected to the basis weight sensor 26 through a cable (not shown), or the like, and recognizes the type of a sheet by searching the threshold table T with a grammage received from the basis weight sensor 26.

When the sheet type corresponding to a button selected by a user (e.g., a service person or an administrative user) via the sheet type setting screen Sc1 (see FIG. 7) does not match the sheet type recognized by the sheet type recognition portion 17, the threshold corrector 18 (one example of a condition changing portion) corrects the threshold.

Specifically, the threshold corrector 18 calculates a difference between: the grammage (one example of a first physical property value) that is detected by the basis weight sensor 26 and used by the sheet type recognition portion 17 to recognize the sheet type; and the grammage (one example of a second physical property value) that is associated with the sheet type corresponding to the button selected by the user. The threshold corrector 18 corrects the threshold by subtracting or adding the calculated difference, which is a shift amount, from or to the threshold in the threshold table T (see FIG. 1) so that the grammage associated with the sheet type corresponding to the button selected by the user will match the grammage detected by the basis weight sensor 26.

The threshold corrector 18 may change, instead of a threshold, a sheet detection (sensing) condition for the basis weight sensor 26. Alternatively, the threshold corrector 18 may change a threshold to be used (one example of a second threshold) when transmitted light L3 or reflected light L2 (see FIG. 3) detected by the basis weight sensor 26 is converted into grammage.

<Configuration of Basis Weight Sensor>

Figure 3:
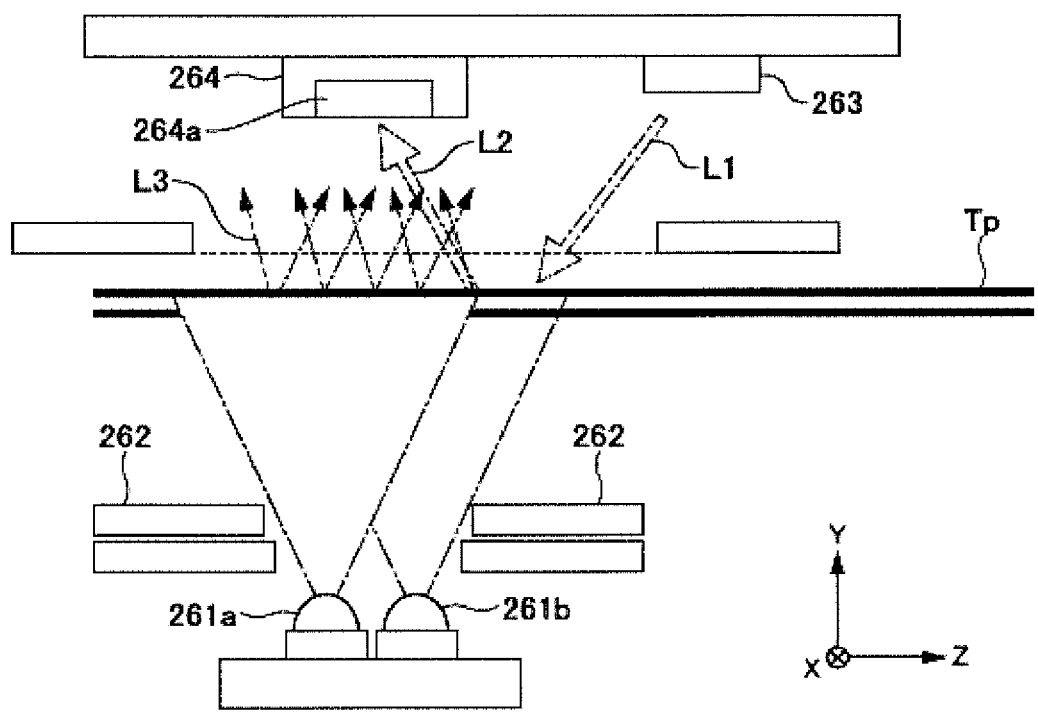
FIG. 3 illustrates a configuration of a basis weight sensor.

Hereinafter, a configuration of the basis weight sensor 26 will be described with reference to FIG. 3. FIG. 3 illustrates an example of a configuration of the basis weight sensor 26.

As referred to FIG. 3, the basis weight sensor 26 is provided with: transmitted light sources 261a and 261b; reflected light regulating plates 262; a reflected light source 263; and a photoreceptor 264. The transmitted light source 261a is constituted by a light-emitting diode (LED) that emits near-infrared rays, for example. The transmitted light source 261b is constituted by an LED or the like that emits blue light. The photoreceptor 264 is provided with a photodiode 264a as a light receiving element.

The reflected light regulating plates 262 are plates that serve to correct a value measured by the photoreceptor 264. The reflected light source 263 is constituted by an LED or the like that emits green light. The photodiode 264a receives: the transmitted light L3, which is emitted from the transmitted light sources 261a and 261b then transmitted through the sheet being conveyed along the conveyance path Tp; and the reflected light L2, which is source light L1 that is emitted from the reflected light source 263 then reflected by the sheet. The photodiode 264a measures the transmission (one example of a physical property value) of the transmitted light L3 received by itself and the reflectance (one example of a physical property value) of the reflected light L2 received by itself, then outputs the measured values to the sheet type recognition portion 17 (see FIG. 1).

For reference, the transmitted light sources 261a and 261b are located in the lower region of FIG. 3, and the reflected light source 263 is located in the upper region of the same. In practice, as referred to FIG. 1, the transmitted light sources 261a and 261b are disposed on the right of the sheet being conveyed in a vertical direction, and the reflected light source 263 is disposed on the left of the same.

As referred to FIG. 1, the basis weight sensor 26 is disposed in the upstream of the paper stop rollers 25 so that the basis weight sensor 26 can detect the grammage of the sheet while the sheet is stopped with its forefront end being in contact with the nip between the paper stop rollers 25.

<Threshold Configuration>

Figure 4:
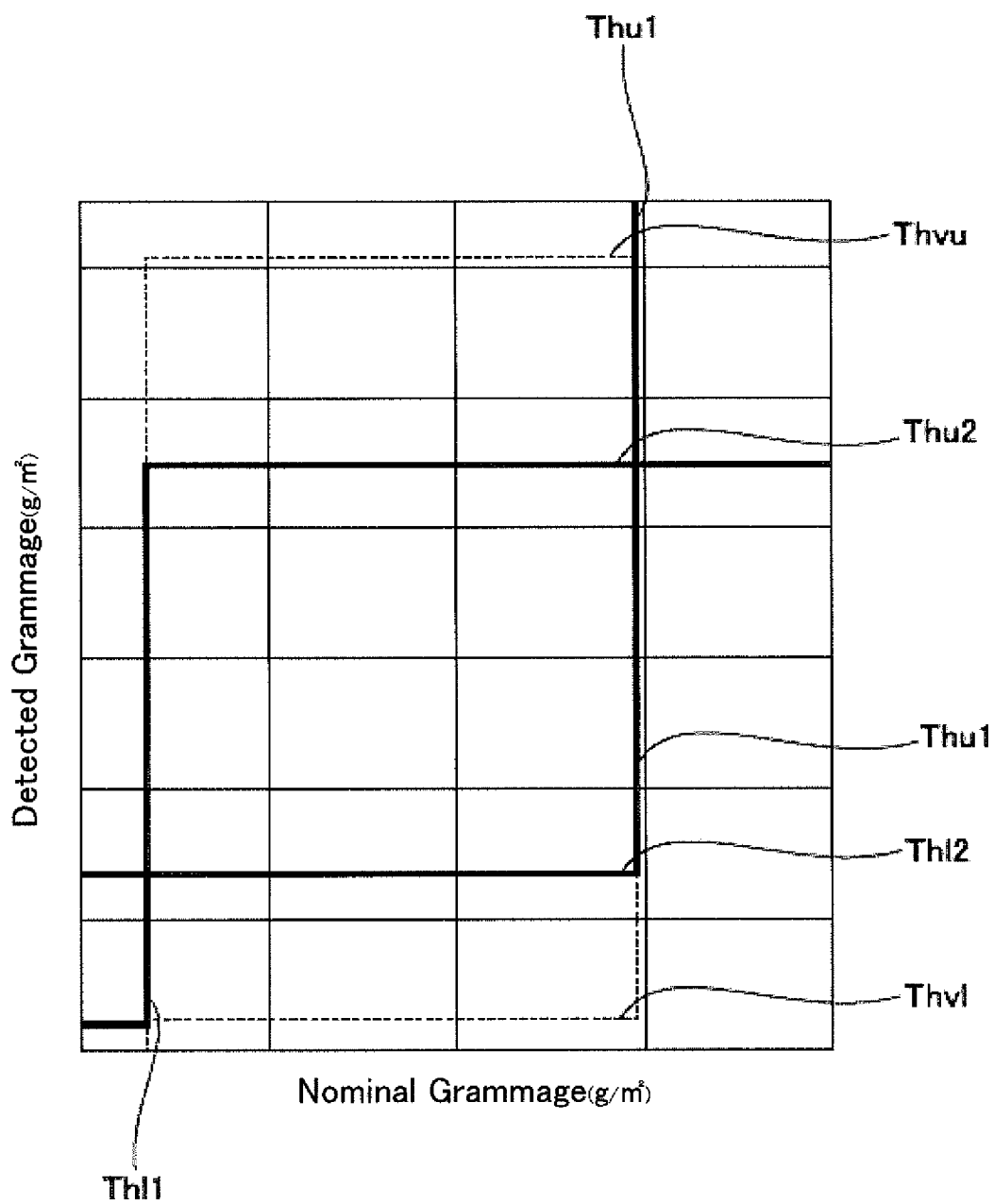
FIG. 4 is a graph for reference in describing a threshold configuration written in a threshold table.

Hereinafter, a threshold configuration written in the threshold table T will be described with reference to FIG. 4. FIG. 4 is a graph showing an example of the threshold configuration.

The graph in FIG. 4 has a horizontal axis representing a nominal grammage ($g/m^2$) and a vertical axis representing a detected grammage ($g/m^2$) detected by the basis weight sensor 26. The graph shows two vertical bold solid lines. One in the left region of the graph indicates a minimum nominal grammage Thl1, and the other one in the right region of the graph indicates a maximum nominal grammage Thu1. The graph further shows two horizontal bold solid lines. One in the upper region of the graph indicates a maximum detected grammage Thu2, and the other one in the lower region of the graph indicates a minimum detected grammage Thl2. The four solid lines, i.e., the minimum nominal grammage Thl1, the maximum nominal grammage Thu1, the maximum detected grammage Thu2, and the minimum detected grammage Thl2 define a rectangular area that represents the range of a threshold by which this type of paper is recognized.

The graph further shows two horizontal dashed lines. One in the upper region of the graph indicates a maximum allowable detected grammage Thvu, and the other one in the lower region of the graph indicates a minimum allowable detected grammage Thv1. When the maximum detected grammage Thu2 is corrected, it can be increased to the maximum allowable detected grammage Thvu at the maximum. When the minimum detected grammage Thl2 is corrected, it can be decreased to the minimum allowable detected grammage Thv1 at the minimum.

In the present embodiment, when the conditions for image forming are changed to fit a sheet type, the minimum detected grammage Thl2 and the maximum detected grammage Thu2, respectively, are set to a minimum and maximum of the grammage segment for the sheet type. Alternatively, the minimum detected grammage Thl2 and/or the maximum detected grammage Thu2 may be set to any desirable value by a user depending on the business or convenience of the user.

The minimum detected grammage Thl2 and/or the maximum detected grammage Thu2 may be set to the average of the detection results in grammage which are obtained by the basis weight sensor 26 from multiple sheets loaded into the image forming apparatus 100. Alternatively, the minimum detected grammage Thl2 and/or the maximum detected grammage Thu2 may be set to a value with reference to standard deviations calculated from the multiple detection results obtained by the basis weight sensor 26. For example, the minimum detected grammage Thl2 and/or the maximum detected grammage Thu2 may be set to one of the multiple detection results obtained by the basis weight sensor 26, which has a low standard deviation.

<Example of Settings in Threshold Table>

Hereinafter, an example of settings in the threshold table T will be described with reference to FIG. 5. FIG. 5 shows an example of the settings in the threshold table T.

In the left field of the table in FIG. 5, a minimum and maximum of the allowable threshold range are shown along with a sheet type. In the right field of the table in FIG. 5, a minimum and a maximum of the detected grammage threshold range are shown. FIG. 5 shows an example of threshold settings configured on the image forming apparatuses 100 to be shipped to Japan, United States of America (inch), and Europe. The threshold table T shown in FIG. 5 has an example of thresholds for Japan, United States of America, and Europe all together, just for reference. In practice, the threshold table T has thresholds only for the destination country of the image forming apparatus 100.

For example, according to the threshold table T shown in FIG. 5, the maximum detected grammage of a sheet classified in "thin paper" is 58.7 $g/m^2$ for Japan, United States of America, and Europe, the minimum of the allowable threshold range is 52 $g/m^2$, and the maximum of the allowable threshold range is 59 $g/m^2$.

Furthermore, the minimum detected grammage of a sheet classified in "plain paper" is 58.8 $g/m^2$ for Japan, United States of America, and Europe, and the maximum detected grammage is 96.2 $g/m^2$ for Japan and Europe and 98.3 $g/m^2$ for United States of America.

FIGS. 6A, 6B, and 6C are graphs that reflect the thresholds determined in the threshold table T shown in FIG. 5. FIG. 6A is a graph showing an example of the thresholds for the image forming apparatus 100 to be shipped to Japan. FIG. 6B is a graph showing an example of the thresholds for the image forming apparatus 100 to be shipped to United States of America. FIG. 6C is a graph showing an example of the thresholds for the image forming apparatus 100 to be shipped to Europe.

According to the threshold table T shown in FIG. 5, the detected grammage threshold range is different depending on the destination country: Japan, United States of America, or Europe. Therefore, the rectangular areas in FIGS. 6A, 6B, and 6C, which represent the threshold ranges, are different in width and height depending on the destination country: Japan, United States of America, or Europe.

The threshold table T will be continuously described with reference to FIG. 5. The minimum detected grammage in the threshold table T of FIG. 5 corresponds to the minimum detected grammage Thl2 in the graph of FIG. 4. The maximum detected grammage in the threshold table T of FIG. 5 corresponds to the maximum detected grammage Thu2 in the graph of FIG. 4. Furthermore, the minimum of the allowable threshold range in the threshold table T of FIG. 5 corresponds to the minimum detected grammage Thl2 in the graph of FIG. 4. The maximum of the allowable threshold range in the threshold table T of FIG. 5 corresponds to the maximum detected grammage Thu2 in the graph of FIG. 4.

For example, when the type of a sheet loaded into the image forming apparatus 100 to be shipped to Japan is "plain paper", the grammage to be detected by the basis weight sensor 26 is supposed to fall within the range from the minimum detected grammage Thl2, 58.8 g/m² to the maximum detected grammage Thu2, 96.2 g/m². However, the detection result obtained by the basis weight sensor 26 may be 52 g/m², which falls within the threshold range for "thin paper". In this case, the sheet type recognition portion 17 would incorrectly recognize the type of the sheet as "thin paper".

To address this problem, in the present embodiment, the sheet type setting screen Sc1 (see FIG. 7) displays the recognition result, "thin paper" and other sheet types in a form of selectable buttons. This allows a user to input a correct sheet type.

<Configuration of Sheet Type Setting Screen>

Hereinafter, a configuration of the sheet type setting screen Sc1 will be described with reference to FIG. 7. FIGS. 7A and 7B illustrate examples of a configuration of the sheet type setting screen Sc1. FIG. 7A illustrates an example of a configuration of the sheet type setting screen Sc1, on which a button with a title of a sheet type recognized by the sheet type recognition portion 17 is displayed in a highlighted manner. FIG. 7B illustrates another example of a configuration of the sheet type setting screen Sc1, on which a button with a title of a sheet type selected by a user is displayed in a highlighted manner.

As referred to FIGS. 7A and 7B, the sheet type setting screen Sc1 has: a paper type setting button display area Ar1; a detected grammage display area Ar2; a grammage shift amount display area Ar3; a learning mode button Bn1; a start button Bn2; and a stop button Bn3.

The paper type setting button display area Ar1 displays multiple buttons with titles of different paper types (sheet types). In the example of FIG. 7A, the button titled "Thin Paper" is displayed in a highlighted manner, which means the sheet type recognized by sheet type recognition portion 17 is thin paper.

When the highlighted sheet type does not match the actual sheet type, a user (e.g., a service person or an administrative user) who is operating the screen in the sheet type learning mode can select a button with a title of the correct sheet type. In FIG. 7B, the button titled "Thin Paper" is pressed by the user. When the highlighted sheet type matches the actual sheet type, the user does not have to select a correct button.

The detected grammage display area Ar2 displays a grammage (g/m²) detected by the basis weight sensor 26 (see FIG. 3). With reference to the grammage displayed in the detected grammage display area Ar2, the user can determine whether or not the recognition result obtained by the sheet type recognition portion 17 is correct.

The grammage shift amount display area Ar3 displays a difference between the grammage for the recognition result, which is the recognized sheet type, and the grammage for the sheet type selected by the user, as a grammage shift amount. When, after the learning mode button Bn1 is pressed, the threshold corrector 18 determines that the recognition result obtained by the sheet type recognition portion 17 does not match the sheet type corresponding to a button selected by the user, the grammage shift amount is displayed in the grammage shift amount display area Ar3.

In the examples of FIGS. 7A and 7B, the detected grammage display area Ar2 and the grammage shift amount display area Ar3 are both displayed on the sheet type setting screen Sc1. However, the present invention should not be limited to these examples. Either or neither of the detected grammage display area Ar2 and the grammage shift amount display area Ar3 may be displayed.

The learning mode button Bn1 is a button to make the threshold corrector 18 start calculating a difference (shift amount) and performing a correction process upon being pressed by the user.

The start button Bn2 is a button to start a print job. The stop button Bn3 is a button to terminate the learning mode and stop the print job which is started upon pressing of the start button Bn2.

For example, the basis weight sensor 26 may detect a grammage of 52 g/m², and accordingly the sheet type recognition portion 17 may recognize the sheet type as "thin paper". In this case, the button titled "Thin Paper" is displayed in a highlighted manner, as shown in FIG. 7A. When the actual sheet type is plain paper, the user selects a button titled "Plain Paper" as shown in FIG. 7B, then presses the learning mode button Bn1.

The threshold corrector 18 thus calculates a difference between the detected threshold for plain paper, 52 g/m² and the minimum detected grammage (the minimum threshold for Japan in FIG. 5), 58.8 g/m², and thereby obtains 6.8 g/m². Subsequently, the threshold corrector 18 subtracts the difference, 6.8 g/m², which is a shift amount, from the minimum detected grammage, 58.8 g/m², and thereby corrects the minimum detected grammage to 52 g/m². In relation to the correction, the threshold corrector 18 further corrects the maximum detected grammage for thin paper to 51.9 g/m².

In these examples of the present embodiment, the threshold corrector 18 performs threshold correction using a difference between the grammage detected by the basis weight sensor 26 and the grammage associated with a sheet type selected by the user. However, the present embodiment should not be limited to these examples. For example, the range from the maximum threshold to the minimum threshold may be marked off so that the threshold corrector 18 could change the threshold in a predetermined number of steps. This will facilitate the threshold correction process of the threshold corrector 18.

<Sheet Type Recognition Method>

Hereinafter, a sheet type recognition method for the image forming apparatus 100 will be described with reference to FIG. 8. FIG. 8 is a flowchart representing an example of a sheet type recognition process, which is to be followed by the image forming apparatus 100.

The image forming apparatus 100 starts a sheet type recognition process upon pressing of the learning mode start button (not shown) displayed on a screen of the console 3, by a user having set sheets in the paper tray 12 (see FIG. 1).

Initially, the controller 11 (see FIG. 2) of the image forming apparatus 100 detects pressing of the learning mode start button (Step S1). The display controller 16 makes the console 3 display the sheet type setting screen Sc1 (see FIG. 7) (Step S2). The controller 11 starts paper conveyance to feed a sheet to the paper stop rollers 25 from the paper tray 12 (Step S3).

Detecting the presence of the sheet, the basis weight sensor 26 detects the grammage of the sheet (Step S4). Then, the sheet type recognition portion 17 recognizes the type of the sheet with reference to the grammage detected by the basis weight sensor 26 (Step S5). The display controller 16 highlights one of the paper type setting buttons, which corresponds to the sheet type recognized by the sheet type recognition portion 17, in Step S5 (Step S6).

The display controller 16 makes the console 3 display the grammage detected by the basis weight sensor 26 in Step S4, in the detected grammage display area Ar2 of the sheet type setting screen Sc1 (see FIG. 7) (Step S7). The controller 11 determines whether or not the learning mode button Bn1 in the sheet type setting screen Sc1 is pressed by the user (Step S8). When the learning mode button Bn1 is not pressed yet in Step S8 (NO in Step S8), the controller 11 repeats Step S8.

When the learning mode button Bn1 is pressed in Step S8 (YES in Step S8), the threshold corrector 18 determines whether or not the sheet type selected by the user matches the sheet type recognized by the sheet type recognition portion 17 (Step S9). When the sheet type matches the other one in Step S9 (YES in Step S9), the sheet type recognition process of the image forming apparatus 100 is terminated. That is, when the sheet type selected by the user matches the sheet type recognized by the sheet type recognition portion 17, the threshold corrector 18 does not perform a threshold correction process.

When the sheet type does not match the other one in Step S9 (NO in Step S9), the threshold corrector 18 calculates a difference between the grammage detected by the basis weight sensor 26 and the grammage for the sheet type selected by the user (Step S10). The threshold corrector 18 corrects the threshold by which the sheet type is recognized, using the calculated difference as a shift amount (Step S11). The threshold corrector then records the corrected threshold in the threshold table T (see FIG. 5) stored in the memory 13 (Step S11).

Subsequently, the controller 11 sets the sheet type for printing (image forming) to the sheet type whose threshold has just been corrected (Step S12). After Step S12, the sheet type recognition process of the image forming apparatus 100 is terminated.

When the learning function learns multiple sheets recognized as the same sheet type, the correction amounts to be used by the threshold corrector 18 may be varied. In this case, the threshold corrector 18 performs correction using the average of the correction amounts. Alternatively, the threshold corrector 18 may perform correction with reference to standard deviations calculated from the correction amounts. This process will improve accuracy in correction.

In this example, the basis weight sensor 26 detects the grammage of a sheet. Alternatively, an ultrasonic sensor, which is composed of an ultrasonic emitter and receiver, may determine whether the type of a sheet is envelope. In this case, the threshold corrector 18 corrects a determination result whether the sheet type is envelope, by correcting the voltage value detected by the receiver of the ultrasonic sensor as necessary. Furthermore, when the learning function learns multiple sheets recognized as the same sheet type, the correction amounts in voltage may be varied. In this case, the threshold corrector 18 performs correction using the average of the correction amounts or with reference to standard deviations calculated from the correction amounts.

After completion of the threshold correction by the learning function described with reference to FIG. 8, a process of collecting sheet brand-related information is performed. In this embodiment, paper brand information (sheet brand information) is an example of the sheet brand-related information. Alternatively, it may be sheet type information or a threshold by which a sheet type is recognized. In sum, it is preferred that it is at least one of paper brand information, sheet type information, and a threshold by which a sheet type is recognized.

Figure 9:
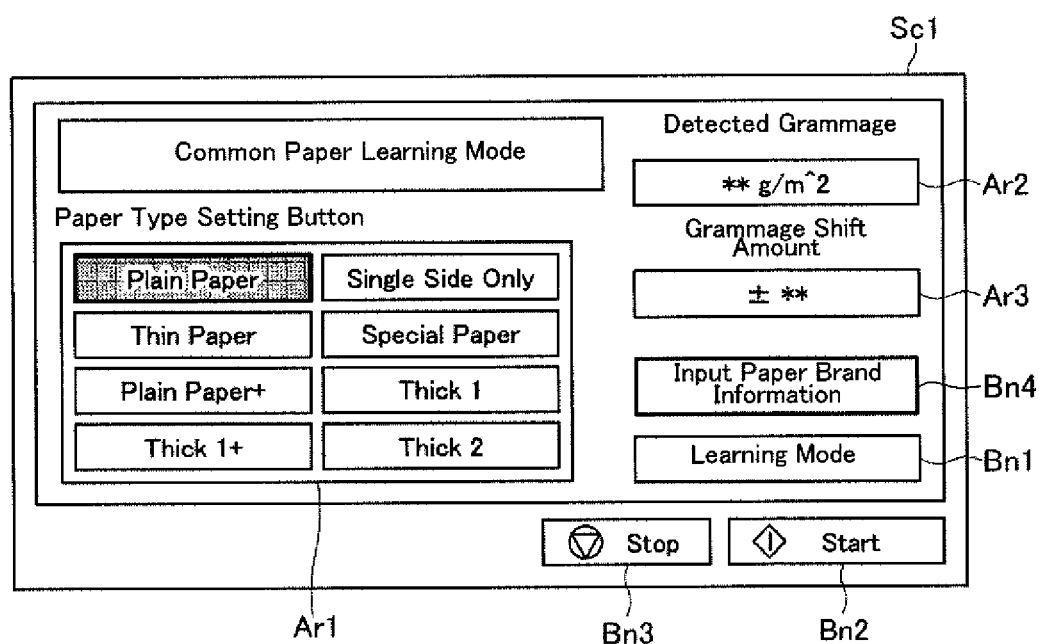
FIG. 9 illustrates a screen for input of paper brand information.

As referred to FIG. 9, the sheet type setting screen Sc1 displayed on the console 3 has a paper brand information input button Bn4 to input paper brand information. Upon pressing of the paper brand information input button Bn4, a paper brand information input mode is enabled.

Figure 10:
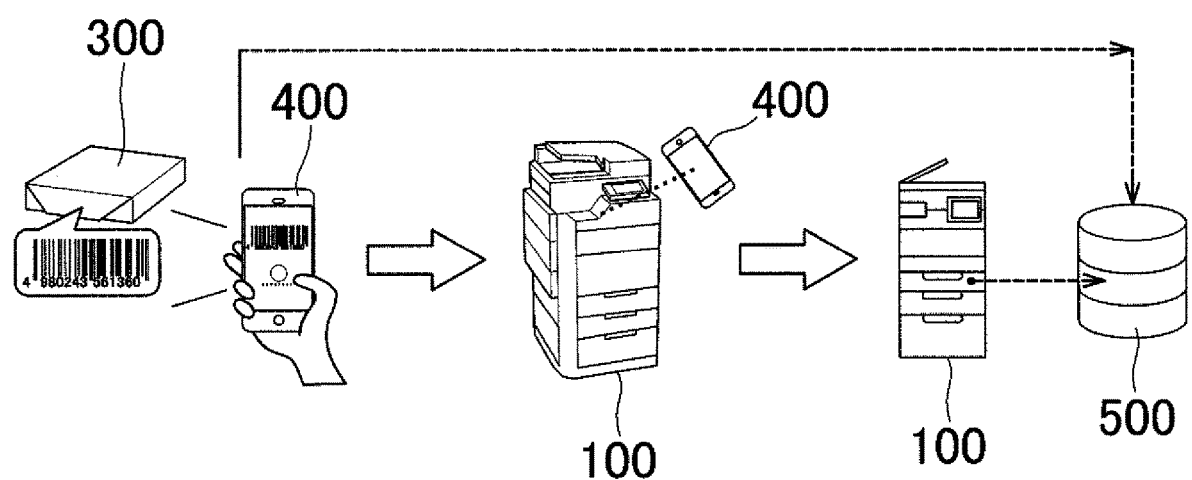
FIG. 10A is an example diagram for reference in describing a procedure to input the paper brand information.
FIG. 10B is an example diagram for reference in describing a procedure to input the paper brand information.
FIG. 10C is an example diagram for reference in describing a procedure to input the paper brand information.

The package of a sheet 300 may have barcode information as sheet type information as illustrated in FIG. 10A. In this case, a portable information terminal 400 scans the barcode and obtains decimal number information that is an article code (EAN, JAN, or the like) of the sheet 300. After the scan, as referred to FIG. 10B, the portable information terminal 400 gets close to the image forming apparatus 100 and transfers the article code to the image forming apparatus 100 using a wireless communication (NFC) means installed in the image forming apparatus 100. It may use, as a transfer method, near-field wireless communications such as BLUETOOTH, infrared communication, and Wi-Fi, as well as NFC.

Receiving the article code, the image forming apparatus 100 stores, in the memory 13 or the like, the physical property value-related information obtained in the process of FIG. 8 and the paper brand information in association with each other. Physical property value-related information of a sheet includes a physical property value of the sheet, a grammage to which the physical property value is converted, and the like. Specifically, in this embodiment, physical property value-related information includes information brought by the basis weight sensor 26 and the others, which is paper type information, sensor data, a grammage shift amount (number of steps), a correction amount (number of steps) in the case of an incorrect sheet type, and the like.

The image forming apparatus 100 may store the information in, instead of the memory 13 inside the image forming apparatus 100 itself, an external memory such as an USB memory, which is externally attached to the image forming apparatus 100, a print server such as a FIERY print server, which is externally attached to the image forming apparatus 100 as an expanded option, or a local or cloud storage server that is not of CSRA or SCRC (remote security service for multifunction machines).

The package of the sheet 300 may not have barcode information as sheet type information. In this case, paper brand information is inputted with a software keyboard in a screen on the console 3 of the image forming apparatus 100. Then, the image forming apparatus 100 stores the physical property values and the paper brand information in the memory 13 in association with each other.

After that, it is preferred that the paper brand information is put into a machine maintenance list that is used by a service person to share error information with a development department. The machine maintenance list can be outputted in two formats: paper format and CSV format.

In the manner described above, the image forming apparatus 100 is allowed to collect information brought by the basis weight sensor 26 and the others, which is paper brand information and physical property value-related information such as paper type information, sensor data, a grammage shift amount (number of steps), and a correction amount (number of steps).

After that, as referred to FIG. 10C, the image forming apparatus 100 transfers both the physical property value-related information and the paper brand information to an external storage apparatus (terminal server) 500 that is an information processing apparatus of CSRA or CSRC mentioned above. The external storage apparatus 500 is constituted by a personal computer or the like. Receiving the physical property value-related information and the paper brand information, the external storage apparatus 500 stores both of them in a memory (not shown) in accordance with a program.

Alternatively, the portable information terminal 400 may transfer the data directly to the external storage apparatus (terminal server) 500 through a telephone circuit or a Wi-Fi network.

In the manner described above, information is transferred to the external storage apparatus 500. This allows the external storage apparatus 500 to widely collect, possibly from all over the world, information brought by the basis weight sensor 26 and the others, which is paper brand information and physical property value-related information such as paper type information, sensor data, a grammage shift amount (number of steps), and a correction amount (number of steps).

The external storage apparatus 500 has firmware (FW) having reinforcement learning algorithms designed to revise its present algorithms for the paper type recognition process with reference to the data. As occasion requires, the firmware is updated to revise the algorithm. When it comes to the firmware of the image forming apparatus 100, the latest firmware version is delivered to the image forming apparatus 100 so that the firmware will be automatically updated to revise the algorithm. The image forming apparatus 100 may be further provided with a selecting portion to select automatic or non-automatic firmware update. In this case, the firmware is automatically updated only when a user (e.g., a service person or an administrator) selects automatic firmware update.

It is hardly possible that the development department of the image forming apparatus 100 solely collects information of all existing sheet types (paper brand information). In the present embodiment, information of any sheet types used by users are thoroughly collected so that the development department can efficiently work on the development and analysis of algorithms for paper type recognition.

Figure 11:
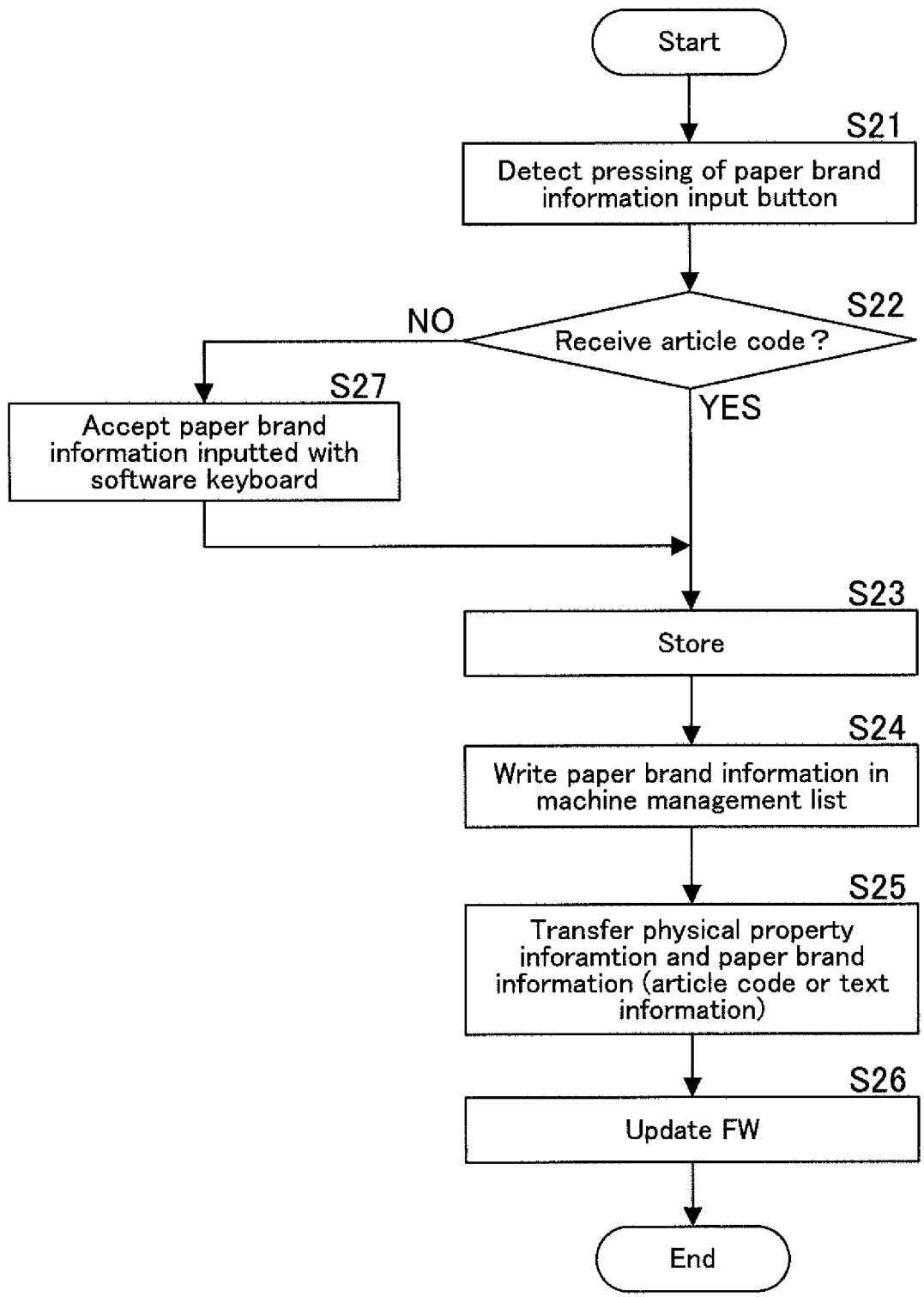
FIG. 11 is a flowchart representing operations of the image forming apparatus when the paper brand information is inputted.

FIG. 11 is a flowchart representing operations of the image forming apparatus 100 when paper brand information is inputted. These operations are performed by the CPU 111 of the controller 11 of the image forming apparatus 100 in accordance with operation programs stored in the ROM 102 or the like.

When pressing of the paper brand information input button Bn4 in the sheet type setting screen Sc1 is detected (Step S21), the paper brand information input mode is enabled. Then, it is determined whether or not article code information is received from the portable information terminal 400 (Step S22). When it is received (YES in Step S22), the procedure proceeds to Step S23. When it is not received (NO in Step S22), paper brand information inputted with the software keyboard displayed on the console 3 is accepted (Step S27). The procedure then proceeds to Step S23.

In Step S23, information brought by the basis weight sensor 26 and the others, which is physical property values such as paper type information, sensor data, a grammage shift amount (number of steps), and a correction amount (number of steps), and the paper brand information are stored in the memory 13 in association with each other.

The paper brand information is written in the machine maintenance list (Step S24). Then, the physical property value-related information and the paper brand information are transferred to the external storage apparatus 500 (Step S25).

As occasion requires, the firmware is updated (Step S26).

In the process described above, methods of inputting paper brand information are introduced. For example, a barcode is scanned, and an article code is transferred from the portable information terminal 400, thereby paper brand information is inputted. For another example, paper brand information is inputted with the software keyboard. Alternatively, paper brand information may be inputted by speech with a speech input portion such as a microphone, which is attached to the image forming apparatus 100. Alternatively, paper brand information may be taken and inputted with a camera attached to the image forming apparatus 100. Alternatively, paper brand information on the package may be scanned and inputted with the IR unit 42 that is an image reading device.

Figure 12:
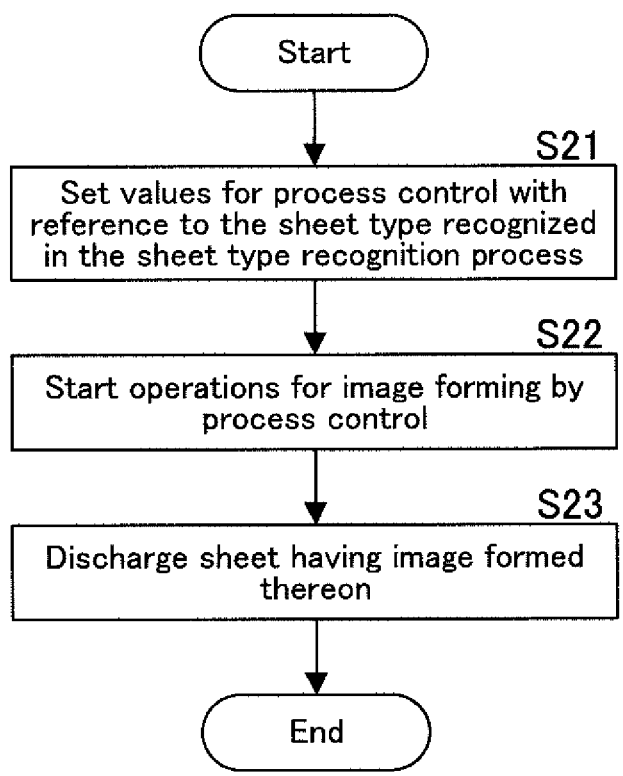
FIG. 12 is a flowchart representing an example of an image forming process, which is to be followed by the image forming apparatus when a start button Bn2 in the sheet type setting screen Sc1 is pressed.

FIG. 12 is a flowchart representing an example of an image forming process, which is to be followed by the image forming apparatus 100 when the start button Bn2 in the sheet type setting screen Sc1 is pressed.

Initially, the controller 11 (see FIG. 2) of the image forming apparatus 100 sets values for process control (the conditions for image forming) with reference to a recognition result obtained in the sheet type recognition process of FIG. 8 (Step S21). In other words, the controller 11 sets various values suitable for a sheet type such as "thin paper" or "plain paper".

Subsequently, the controller 11 of the image forming apparatus 100 starts image forming operations by process control (Step S22), and a sheet with an image formed thereon is discharged on the paper output tray 27 (see FIG. 1) (Step S23). After Step S23, the image forming process of the image forming apparatus 100 is terminated.

In the above embodiment, when a sheet type inputted via the sheet type setting screen Sc1 does not match a sheet type recognized by the sheet type recognition portion 17, the threshold corrector 18 calculates a difference between a physical property value detected by the basis weight sensor 26 and a physical property value associated with the inputted sheet type. The threshold corrector 18 corrects the condition using the difference as a shift amount. In sum, the image forming apparatus 100 according to the present embodiment is allowed to correct the condition by which the sheet type is recognized, without requesting a user to specify a correction amount.

Figure 13:
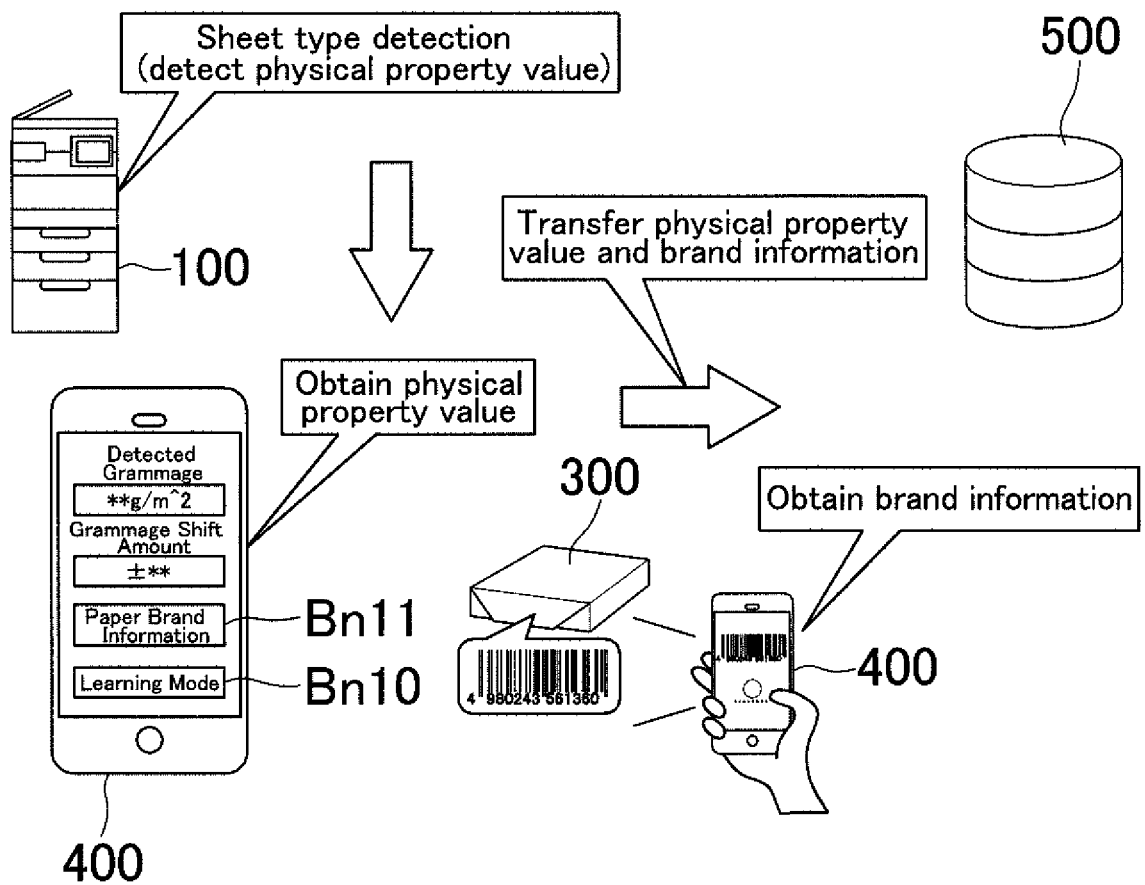
FIG. 13 is a view for reference in describing another embodiment of the present invention.

FIG. 13 is a view for reference in describing another embodiment of the present invention. In this embodiment, when paper brand information is inputted to the portable information terminal 400, the portable information terminal 400 obtains physical property value-related information from the image forming apparatus 100. The portable information terminal 400 then transfers the physical property value-related information and the paper brand information to the external storage apparatus 500 in association with each other.

An operation screen displayed on the portable information terminal 400 includes a learning mode button Bn10 and a paper brand information button Bn11. Before the image forming apparatus 100 performs paper type recognition, a user such as a service person presses the learning mode button Bn10 in the screen of the portable information terminal 400 to activate a learning mode application installed on the image forming apparatus 100. The learning mode in the process of FIG. 8 is thus enabled. As a matter of course, the user may alternatively press the learning mode button Bn1 in the operation screen of the image forming apparatus 100, which is described above.

In the process of FIG. 8, the image forming apparatus 100 performs paper type recognition by the basis weight sensor 26 and the others and detects physical property value-related information such as paper type information, sensor data, a grammage shift amount (number of steps), and a correction amount (number of steps). After that, the image forming apparatus 100 transfers the detected physical property value-related information to the portable information terminal 400. The portable information terminal 400 thus obtains the physical property value-related information.

Subsequently, the user enables the paper brand information input mode by pressing the paper brand information button Bn11 in the screen of the portable information terminal 400. The user then scans a barcode on the package of the paper 300 with a camera attached to the portable information terminal 400, and the portable information terminal 400 thus obtains decimal number information that is an article code of the paper 300. The portable information terminal 400 stores, in a memory (not shown) of the portable information terminal 400 itself, the article code of the paper 300, which is inputted with the camera, and the physical property value-related information obtained from the image forming apparatus 100, in association with each other. Alternatively, the paper brand information may be inputted with the software keyboard in the screen of the portable information terminal 400, by speech, or by another method, as described above.

After that, the portable information terminal 400 transfers both the physical property value-related information and the paper brand information to the external storage apparatus (terminal server) 500.

In the manner described above in this embodiment, the user can transfer physical property value-related information and paper brand information to the external storage apparatus 500 by operating the portable information terminal 400.

Figure 14:
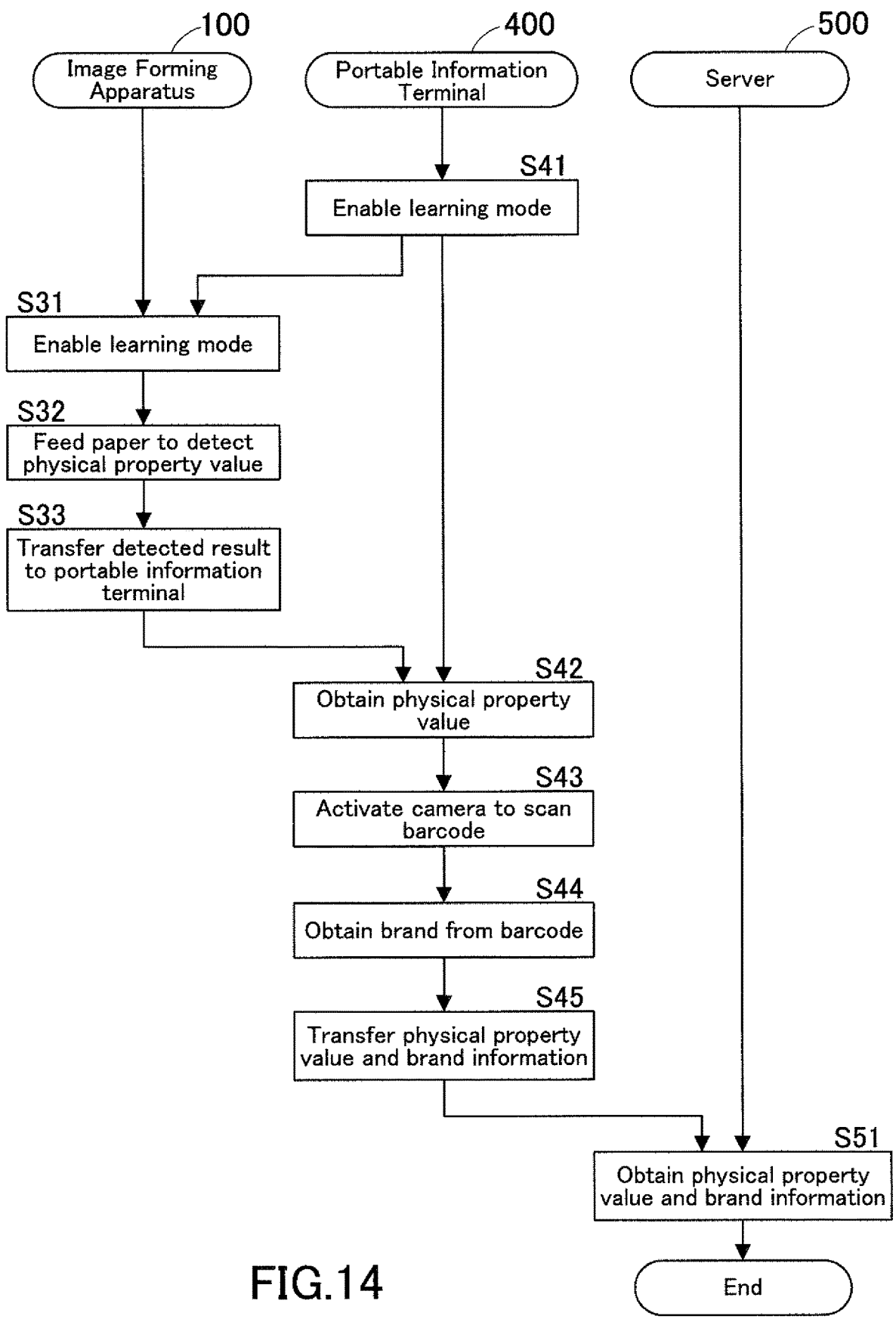
FIG. 14 is a flowchart representing cooperations of the image forming apparatus, a portable information terminal, and an external storage device when the paper brand information is inputted and transferred as described with reference to FIG. 13.

FIG. 14 is a flowchart representing cooperations of the image forming apparatus 100, the portable information terminal 400, and the external storage apparatus (terminal server) 500 when paper brand information is inputted and transferred as described with reference to FIG. 13. These cooperations are performed by the CPUs of the image forming apparatus 100, the portable information terminal 400, and the external storage apparatus 500 in accordance with operation programs.

Upon pressing of the learning mode button Bn10 in the screen of the portable information terminal 400 (Step S41) or upon pressing of the learning mode button Bn1 in the operation screen of the image forming apparatus 100 (Step S31), the learning mode application installed on the image forming apparatus 100 is activated.

In the learning mode, the image forming apparatus 100 detects physical property value-related information from a sheet that is loaded into the image forming apparatus 100 itself (Step S32), and transfers a detection result to the portable information terminal 400 (Step S33).

The portable information terminal 400 receives the physical property value-related information from the image forming apparatus 100 (Step S42).

Subsequently, a user presses the paper brand information button Bn11. The user then activates the camera of the portable information terminal 400 and scans a barcode on the package of the paper 300 with the camera (Step S43). The portable information terminal 400 thus obtains, from the barcode, decimal number information (brand information) that is an article code (Step S44). After that, the portable information terminal 400 transfers both the physical property value-related information and the paper brand information to the external storage apparatus 500 (Step S45).

Receiving the physical property value-related information and the paper brand information from the portable information terminal 400 (Step S51), the external storage apparatus 500 stores them in a memory (not shown).

While some embodiments of the present invention have been described in detail herein, it should be understood that the present invention is in no way limited to the above embodiments. For example, the image forming apparatus 100 may have a function of performing reinforcement learning using inference models of machine learning algorithms (AI). In this case, the firmware is automatically updated by the reinforcement learning function. Alternatively, the firmware may be automatically updated only when a user (e.g., a service person or an administrator) selects automatic firmware update.

In the above embodiments, the image forming apparatus has the learning function and the correction function in an integrated manner. Alternatively, an edge computer terminal in the vicinity of the image forming apparatus may have the learning function and the correction function. In this case, the edge computer terminal corrects, in real time, the grammage or the detected voltage by which to determine whether the sheet type is envelope. Furthermore, the edge computer terminal may further have a function of performing reinforcement learning using inference models of machine learning algorithms (AI). In this case, the firmware is automatically updated by the reinforcement learning function.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
a sensor configured to detect first information related to a physical property value of a sheet, the sheet to have an image formed thereon; and
a processor configured to:
obtain second information related to a brand of the sheet; and
store the first information and the second information in a memory, the first information being detected by the sensor, the second information being obtained by the processor, wherein the processor comprises:
a recognition portion recognizing a sheet type according to the first information detected by the sensor; and
a correction portion configured to correct a recognition result obtained by the recognition portion, and
wherein the processor stores the recognition result in the memory, the recognition result being corrected by the correction portion.

2. The image forming apparatus according to claim 1, wherein the processor stores the first information and the second information in the memory in association with each other.

3. The image forming apparatus according to claim 1, wherein the second information includes at least one of sheet brand information, sheet type information, and a threshold by which a type of the sheet is recognized.

4. The image forming apparatus according to claim 1, being capable of transferring the first information and the second information to another image forming apparatus by way of an external apparatus, the first and second information being stored in the memory.

5. The image forming apparatus according to claim 1, wherein the recognition portion determines whether the sheet type is envelope, and wherein the correction portion corrects a determination result by correcting a voltage value detected by an ultrasonic sensor, the determination result being obtained by the recognition portion.

6. The image forming apparatus according to claim 1, wherein, when the recognition portion recognizes multiple sheets as the same sheet type and correction amounts to be used by the correction portion are varied, the correction portion performs correction using an average of the correction amounts or with reference to standard deviations calculated from the correction amounts.

7. The image forming apparatus according to claim 1, wherein an edge computer terminal in a vicinity of the image forming apparatus has the recognition portion and the correction portion, and
wherein the correction portion corrects the recognition result in real time.

8. The image forming apparatus according to claim 1, wherein the recognition portion further performs reinforcement recognition using inference models of machine learning algorithms, and
wherein the correction portion serves by executing a predetermined algorithm of firmware, and the recognition portion automatically updates the firmware to revise the algorisms.

9. The image forming apparatus according to claim 8, further comprising a selecting portion configured to allow a user to select automatic or non-automatic firmware update.

10. The image forming apparatus according to claim 1, wherein a portable information terminal having a barcode scan function obtains the second information by scanning a barcode, and transfers the second information, and
wherein the processor obtains the second information from the portable information terminal.

11. The image forming apparatus according to claim 10, wherein the portable information terminal transfers the second information using at least one near-field wireless communication from BLUETOOTH, infrared communication, NFC, and Wi-Fi.

12. The image forming apparatus according to claim 1, further comprising a console, wherein the processor obtains the second information, the second information being inputted by a user via the console.

13. The image forming apparatus according to claim 1, wherein the processor obtains the second information, the second information being inputted by at least one of speech, shooting with a camera, and scanning with an image reading device.

14. The image forming apparatus according to claim 1, wherein the second information obtained by the processor is written in a machine management list to be outputted on a paper-based output medium, the paper-based output medium being for a service person to share error information with.

15. The image forming apparatus according to claim 1, wherein the second information obtained by the processor is written in an electronic mail, the electronic mail being for a service person to share error information with.

16. The image forming apparatus according to claim 1, further comprising a transmitter configured to transmit the first information and the second information to an external apparatus, the first and second information being stored in the memory.

17. An information processing apparatus comprising:
a processor configured to:
obtain first information related to a physical property value of a sheet, the sheet to have images formed thereon; and
obtain second information related to a brand of the sheet, wherein the processor comprises:
a recognition portion recognizing a sheet type according to the first information detected by the sensor, and
a correction portion configured to correct a recognition result obtained by the recognition portion; and
a memory configured to store the first information and the second information, the first and second information being obtained by the processor, wherein the processor stores the recognition result in the memory, the recognition result being corrected by the correction portion.

18. The information processing apparatus according to claim 17,
wherein the recognition portion further performs reinforcement recognition using inference models of machine learning algorithms,
wherein the recognition portion serves as the correction portion by executing a predetermined algorithm of firmware, and automatically updates the firmware to revise the algorisms, and
wherein the recognition portion is capable of transmitting the updated firmware to an image forming apparatus.

19. A non-transitory computer-readable recording medium storing a program to make the information processing apparatus according to claim 17 execute:
obtaining first information related to a physical property value of a sheet, the sheet to have images formed thereon;
obtaining second information related to a brand of the sheet; and
storing the first information and the second information in a memory, the first and second information being obtained.

20. An information collecting method comprising:
allowing a sensor to detect first information related to a physical property value of a sheet, the sheet to have an image formed thereon;
allowing a processor to obtain second information related to a brand of the sheet; and
allowing the processor to store the first information and the second information in a memory, the first information being detected by the sensor, the second information being obtained by the processor, wherein the processor comprises:
a recognition portion recognizing a sheet type according to the first information detected by the sensor; and
a correction portion configured to correct a recognition result obtained by the recognition portion, and
wherein the processor stores the recognition result in the memory, the recognition result being corrected by the correction portion.

21. A non-transitory computer-readable recording medium storing a program to make a computer of an image forming apparatus implement the information collecting method according to claim 20.

* * * * *